United States Patent

[11] 3,608,773

| [72] | Inventors | Richard A. Coderre<br>St. Louis Park;<br>Robert H. Leitheiser, Jordan, both of Minn. |
|---|---|---|
| [21] | Appl. No. | 725,273 |
| [22] | Filed | Apr. 29, 1968 |
| [45] | Patented | Sept. 28, 1971 |
| [73] | Assignee | Ashland Oil, Inc.<br>Ashland, Ky. |

[54] COATED TANK
2 Claims, 1 Drawing Fig.

[52] U.S. Cl. .................................................. 220/64
[51] Int. Cl. .................................................. B65d 25/14

[50] Field of Search............................................ 220/64, 64
U, 64 T, 64 D

[56] References Cited
UNITED STATES PATENTS
3,450,295  6/1969  Weber.......................... 220/64 X Primary Examiner—George E. Lowrance
Attorneys—Harold M. Dixon and Plumley, Tyner and Sandt ABSTRACT: A storage tank, the bottom of which has been coated with a layer formed by polymerizing a water-in-oil emulsion without breaking same.

PATENTED SEP 28 1971
3,608,773
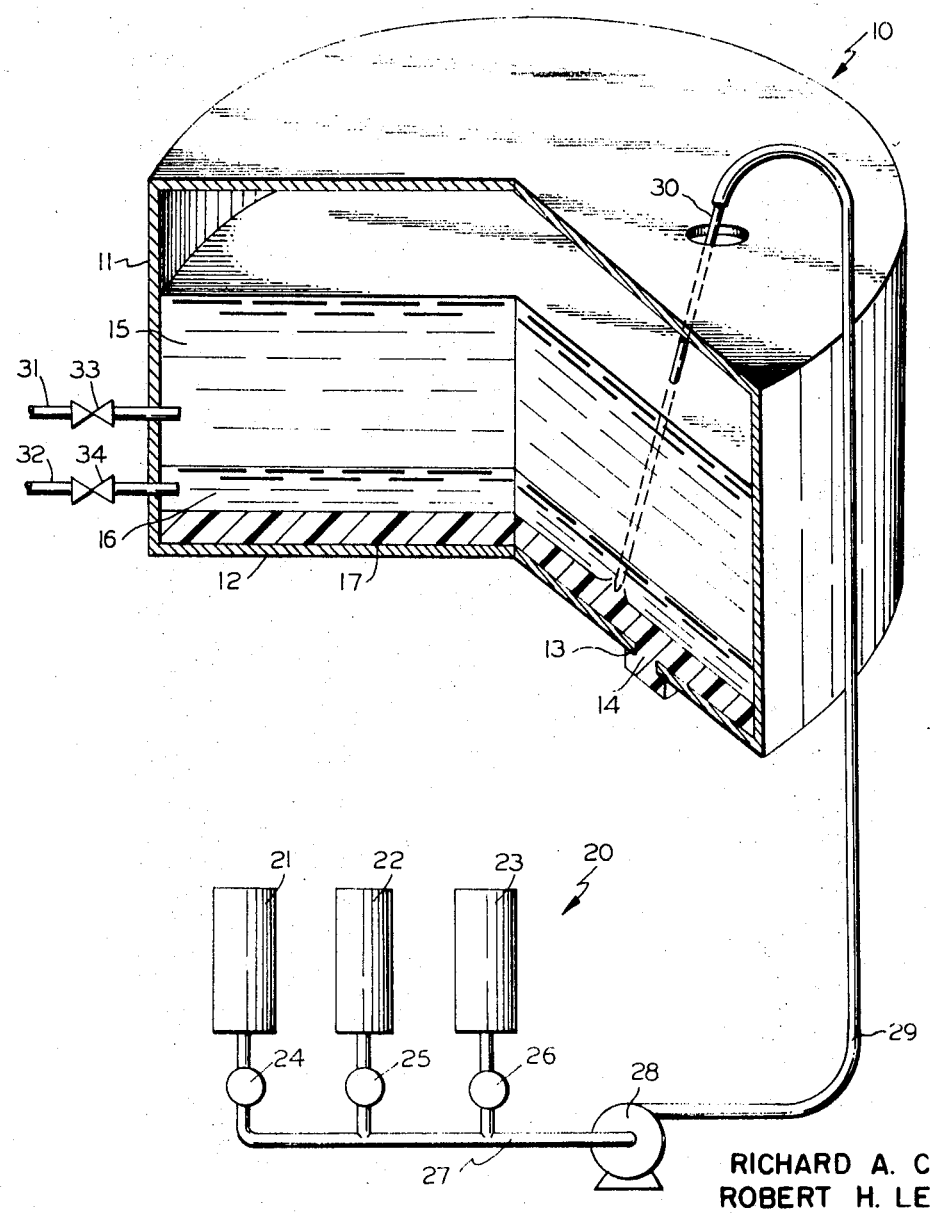
RICHARD A. CODERRE
ROBERT H. LEITHEISER
INVENTOR
BY Plumley, Tyner & Sandt
ATTORNEYS

COATED TANK

It is frequently desirable to coat the bottom of a storage tank presently containing a stored liquid. For example, in the petrochemical industry the bottoms of storage tanks frequently rust or corrode, permitting the undesirable escape of stored liquid. Such rusting is especially prevalent in iron or steel tanks used to store crude oil which frequently contains an amount of brine and sulfurous materials. Known methods of repair generally require emptying and cleaning the tank. Emptying the tank requires the availability of another storage tank to which the stored liquid can be transferred. Cleaning of the tank must be effected in order to render the tank safe for repairmen. Additionally, the tank must be freed of explosive vapors when the tank is to be repaired by welding or soldering. Another method of repair consists of providing the tank with a concrete or masonry bottom, as described, for example, in U.S. Pat. Nos. 2,899,820 and 2,903,877. The desirability of repairing the bottom of a storage tank without removing the stored liquid has long been recognized and considerable effort has been expended in attempting to provide a suitable method. Previous attempts are described for example, in U.S. Pat. Nos. 2,041,392; 2,598,170; and 2,939,801. However, these methods have not proved altogether satisfactory, for a variety of reasons.

It is therefore an object of the present invention to provide a novel method of coating the bottom of a tank, which is free of the disadvantages of the prior art. Another object is to provide a method of coating the bottom of a tank without removing the stored liquid. A further object is to provide an inexpensive method of coating the bottom of a tank, presenting little or no fire hazard. A still further object is to provide a novel tank having an inside-coated bottom. Additional objects and advantages will be apparent to those skilled in the art by reference to the following detailed description.

The above and other objects are accomplished by a method of coating the bottom of a storage tank without removing the stored liquid from the tank, comprising:

A. placing a water-in-oil emulsion under the stored liquid and in contact with the portion of the tank bottom to be coated, said water-in-oil emulsion comprising:
 1. water as the discontinuous phase,
 2. a polymerizable mixture as the continuous phase, comprising an unsaturated polyester and a copolymerizable solvent, and then B. curing the continuous phase of the emulsion.

Emulsions in general and particularly those used to coat tank bottoms according to the present invention are two-phase systems consisting of a discontinuous phase of discrete droplets surrounded by a continuous phase. When the continuous phase is oil, the emulsion is termed "water-in-oil." "Oil," in this context, includes organic materials which are immiscible with water and which otherwise meet the requirements of the "oil phase" of the emulsions described herein. Emulsifying agents can be used to aid formation of the emulsion.

Unsaturated polyesters which can be mixed with copolymerizable solvents to form the continuous phase of the emulsions useful in the present invention are those which (1) contain ethylenic unsaturation, (2) are soluble in a vinyl monomer, and (3) form emulsions either with or without the addition of an emulsifying agent. These polyesters can be produced by procedures well known in the art by heating at esterification temperatures a polyhydric alcohol and a polycarboxylic acid, a portion of which is an alpha, beta-ethylenically unsaturated polycarboxylic acid.

Examples of suitable polycarboxylic acids include, among others, oxalic, malonic, adipic, isophthalic, tetrachlorophthalic, phthalic, their extant anhydrides and mixtures thereof. Examples of suitable alpha, beta-ethylenically unsaturated polycarboxylic acids include, among others, maleic, fumaric, itaconic, their extent anhydrides and mixtures thereof. These latter acids are employed in an amount sufficient to render the polyester crosslinkable by a vinyl monomer, and generally comprise from 1 to 100, preferably 1 to 50, weight percent of the polycarboxylic acid.

The polyhydric alcohols which can be reacted with the polycarboxylic acid in order to give polyesters useful in the present invention are preferably the diols, examples of which include, among others, ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanedoil, and 1,5-pentanediol. Higher polyhydric alcohols such as trimethylol propane and pentaerythritol can be used in minor amounts which do not materially alter the linear nature of the polyester. The polyhydric alcohols are generally employed in the stoichiometrically equivalent or slightly excess amount with respect with to the polycarboxylic acid, and generally comprise from 15 to about 45 percent by weight of the polyester.

Suitable copolymerizable solvents, usually vinyl monomers, are those which are miscible with the polyester and which cure to form an intractible polymerized emulsion. Any vinyl monomer found to be coreactive with unsaturated polyesters can be employed. Examples include, among others, vinyl aromatics such as vinyl toluene and styrene, substituted styrenes such as alpha-methyl styrene, esters such as ethyl acrylate, methyl acrylate, methyl methacrylate, vinyl acetate, trialkyl cyanurate, diallyl phthalate, etc., and vinyl ethers such as methyl vinyl ether and ethyl vinyl ether, as well as acrylonitrile and methacrylamide and compatible mixtures thereof. The vinyl monomer can be employed in a weight ratio with respect to the polyester of from 10:1 to 1:9, and preferably from 3:1 to 1:8.

Although the water phase will generally be substantially all water, solutions of noninterfacing organic and/or inorganic materials in water can be used. Examples of inorganic materials include, among others, sodium hydroxide, calcium carbonate, and sodium chloride as such or in the form of sea water. Examples of organic materials include, among others, methyl alcohol and ethylene glycol. Many of these materials lower the freezing point of the polymerized emulsion and permit its use at low temperatures. Amounts of water from 10 to 95 weight percent, preferably from 40 to 85 weight percent and most preferably from 50 to 80 weight percent, based on the total weight of emulsion can be used. The polymerizable mixture of polyester and copolymerizable solvent can comprise from 5 to 90 and preferably from 15 to 60 weight percent of the emulsion.

The emulsifying agent which is generally used when the polyester is not self emulsifying, must be of the lipophilic type in order to effect the formation of a water-in-oil emulsion. These emulsifying agents generally have hydrophilelipophile balance (HLB) numbers of 2 to 8 and preferably 3 to 5. Examples of such emulsifying agents include, among others, the glycerol monostearates, sorbitan sesquioleate, polyoxyethylene sorbitol oleate, and mixtures thereof. These emulsifying agents are used in the minimum amount sufficient to effect formation of the desired emulsion and generally comprise from 0.1 to 10, preferably 0.5 to 5, weight percent based on the combined weight of polyester, solvent, and water.

The oil phase can be cured by means of any free radical generating catalyst heretofore employed to cause polymerization of vinyl monomers with unsaturated polyesters. Examples of suitable catalysts include, among others, the organic peroxides such as methyl ethyl ketone peroxide, benzoyl peroxide, and di-t-butyl peroxide, as well as the azonitriles. The catalyst is employed in an amount sufficient to catalyze the cross-linking reaction and cause it to proceed at the desired rate, and generally comprises from 0.001 to 10 weight percent based on the weight of the vinyl monomer. Promoters such as cobalt naphthenate or dimethyl aniline can be employed to aid generation of free radicals by the catalyst. To prevent premature gelation, free radical traps such as hydroquinone can be employed, as is well known in the art.

The emulsions useful in the present invention can be formed by a wide variety of processes. In general, it is necessary only to put the components in a vessel and stir mechanically or by hand until the components emulsify. In a particularly preferred method of forming the emulsion continuously, the polyester, vinyl monomer solvent and catalyst are premixed and placed in the first reservoir. In a second reservoir is placed water, and in a third reservoir is placed promoter. Each of the reservoirs is equipped with a pump at its outlet and the outlet streams from each are metered into a mixing chamber (having a relatively high shear) wherein the three streams are emulsified. The mixing chamber outlet is than merely equipped with a delivery tube which can be directed toward a location where the emulsion is to be cured.

The stored liquid in the tanks can be any liquid such as water, a liquid hydrocarbon, or a combination of the two. By water is meant water and solutions of water containing dissolved materials such as sodium chloride solutions known as brine. By liquid hydrocarbon is meant crude oil, gasoline, kerosene, lubricating oil, and other liquids of a hydrocarbon nature which are immiscible with water.

Since curing of the emulsions employed in the present invention is inhibited by hydrocarbons, in a preferred embodiment of the present invention, the storage tank is provided with a continuous layer of water below the stored liquid such as a liquid hydrocarbon. In the case of tanks containing crude oil, this layer of water is generally automatically provided by the brine entrained in the crude oil as extracted from the well. In tanks wherein the liquid hydrocarbon is the sole liquid, a layer of water can be provided by simply pumping water into the tank. If the density of water is not greater than that of the liquid hydrocarbon or the water layer when present, the density of the emulsion can be raised by a variety of means. Thus, dense fillers such as siliceous sand, calcium carbonate, or titanium dioxide can be admixed with the polyester. The polyester can be formulated from dense acids and/or dense alcohols such as those which have been halogenated, examples of which include tetrachlorophthalic acid and chlorendic acid. A dense copolymerizable solvent such as $\alpha$-chloro styrene can also be employed. The preferred means of increasing the density of the emulsion is to dissolve a soluble salt such as sodium chloride or calcium chloride in the water destined to be the discontinuous phase of the emulsion. The amount of salt employed is generally from that just sufficient to give an emulsion having a density just greater and preferably about 5 percent greater than that of the stored liquid, up to the amount present in a saturated solution. Thus, the salt is generally employed in weight ratios of 5:100 to 30:100 and preferably 10:100 to 20:100 salt to water. Obviously two or more of the above means can be simultaneously employed. The water sinks to the bottom of the tank and raises the liquid hydrocarbon, thus forming a layer of water over the bottom of the tank.

In a preferred embodiment of the present invention, the portion of the tank bottom to be coated is cleaned with a water immiscible cleaning agent. Any water-immiscible cleaning agent can be employed which has a density greater than that of water, examples of which are the chlorinated hydrocarbons such as carbon tetrachloride. The cleaning agent is pumped into the tank underneath the water layer and agitated to remove soluble materials from the bottom of the tank. The cleaning agent containing the soluble materials is then removed and the tank bottom coated as described herein.

Although virtually any tank having any structure can have its bottom coated according to the method of the present invention, the method can most advantageously be used on tanks having vertically disposed sides and a horizontally disposed bottom. The bottom of such tanks can be completely coated with the emulsions according to the present invention, or, alternatively, only that portion of the tank bottom having a hole can be coated. In this case, the emulsion is placed in contact with the rim of the hole and cures in place, bridging and sealing the hole.

The present invention may be better understood by reference to the single FIGURE of the drawing, wherein there is shown schematically that step of the present invention wherein the emulsion is placed in contact with the tank bottom.

In the drawing there is shown a tank 10 resting on the ground. The tank 10 has a vertically disposed side 11 and a bottom 12 in which there is a rim 13 defining a hole 14. Within the tank is a major amount of liquid hydrocarbon 15, and thereunder a water layer 16. Underneath the water layer 16 and in contact with the bottom 12 of the tank 10 is a quantity of a polymerizable emulsion 17. The emulsion 17 is produced by an apparatus 20 comprising a first tank 21 containing a mixture of polyester, styrene, and a catalyst, a second tank 22 containing water, and a third tank 23 containing promoter. The tanks 21, 22, and 23 are each provided respectively with outlets in liquid communication with metering pumps 24, 25, and 26, all of which discharge to a common line 27 connected to the inlet of a centrifugal pump 28 which serves as a high shear mixing chamber. The pump 28 discharges through a flexible hose 29 connected to a rigid pipe 30 which passes through any suitable opening in the top of the tank 10. The pipe 30 can be moved manually to direct the emulsion 17 directly over the hole 14. Alternatively, the pipe 30 can be manipulated to coat the entire bottom 12 of the tank 10. The water to form the water layer 16, the cleaning agent, when employed, and the emulsion 17 can also be introduced into the tank 10 by any other suitable means such as previously provided pipes 31 and 32 which can contain valves 33 and 34.

The invention is illustrated by way of the following examples in which all parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any manner.

EXAMPLE 1

This example illustrates the continuous production of water-in-oil emulsion useful in the present invention, employing an apparatus similar to that shown in the FIGURE. Aropol Q6300, an unsaturated polyester marketed by Ashland Chemical Co. comprising a dipropylene glycol ester of maleic anhydride (50 pounds); styrene (50 pounds); and benzoyl peroxide powder (1 pounds) are mixed and placed in the tank 21. Water is placed in the tank 22. Styrene (5 pounds) and dimethyl toluidine promoter (1 pound) is mixed and placed in tank 23.

The pumps 24 and 25 are Ecco proportioning pumps each connected to a "Zero-Max" 0–400 r.p.m. variable speed gear drive. The pump 26 is a "finger" pump controlled by a "Zero-Max" variable speed gear drive. The pump 28 is an Eastern Centrifugal Pump (3,400 r.p.m.).

The "Zero-Max" units are adjusted to give the desired percentages of oil, water, and promoter, and the pump 28 turned on. When flow is detected in the delivery tube from the mixing pump, the water pump is switched on and emulsion begins to flow through the delivery tube. The tube is then held over containers (not shown) and 6 pounds of emulsion placed in each. Runs were conducted at water levels of 20, 30, 40, 50, 60, 70, and 80 percent to produce Emulsions A through G respectively.

EXAMPLE 2

This example illustrates the coating of the entire bottom of a large tank containing water.

A large water tank having a diameter of 18 feet is determined to have an extensively corroded horizontally disposed bottom. The top of the tank is opened and 500 pounds of Emulsion D produced as described in example 1, except that at 12 weight percent aqueous solution of NaCl is used in the tank 22, is poured onto the top of water in the tank. The emulsion sinks down through the water, completely coats the bottom of the tank, and cures in less than 45 minutes to seal the bottom of the tank.

EXAMPLE 3

This example illustrates the repair of a tank containing gasoline.

A cylindrical tank having a diameter of 45 feet and a height of 20 feet being 80 percent full with gasoline is believed to have a single hole adjacent to a certain spot on one vertical side thereof. Water (300 gallons) is pumped into the tank and sinks to the bottom, raising the upper level of the tank about 1 foot and providing a layer of water about 1 foot high. Emulsion E, (50 gallons) produced as described in example 1, except that a 10 weight percent solution of NaCl in water is used in the tank 22, is placed underneath the water layer adjacent to the hole as shown in the FIGURE of the drawing. After one hour the water is removed by a conventional suction pump. Leakage of gasoline has been eliminated.

EXAMPLE 4

This example illustrates the coating of the bottom of a tank containing crude oil, including the step of cleaning the tank bottom without removing the crude oil.

A cylindrical tank 45 feet in diameter and 20 feet high, filled to a level of 16 feet with crude oil and having therein a layer of brine 18 inches deep as determined by thief sampler, is repaired as follows. Carbon tetrachloride (500 gallons) is pumped via a pipe underneath the water level. The bottom of the tank is scrubbed by brushes attached to 25 foot long handles, manipulated from the top of the tank. The carbon tetrachloride is then removed via a previously provided outlet in the bottom of the tank. Suction is stopped as soon as brine begins coming from the outlet. The bottom of the tank is then coated with an emulsion in the manner described in example 2.

Although the invention has been described in considerable detail with reference to certain preferred embodiments thereof, it will be understood that variations and modifications can be effected within the spirit and scope of the invention as described above and as defined in the appended claims.

What is claimed is:

1. A tank having vertically disposed sides and a horizontally disposed bottom, a rim defining a hole in the bottom, a polymerized water-in-oil emulsion in contact with the rim and bridging the hole, said water-in-oil emulsion comprising:
   A. water as the discontinuous phase,
   B. a polymerized mixture as the continuous phase, comprising an unsaturated polyester and a solvent copolymerizable therewith.

2. The tank of claim 1 wherein the polymerized water-in-oil emulsion further extends from one vertically disposed side to the other and completely covers the bottom of the tank.